United States Patent [19]

Dean

[11] Patent Number: 5,787,559
[45] Date of Patent: Aug. 4, 1998

[54] RIGID FRAME CONSTRUCTION APPARATUS

[76] Inventor: Charles W. Dean, 2444 McGregor Blvd., Fort Myers, Fla. 33901

[21] Appl. No.: 557,797

[22] Filed: Nov. 13, 1995

Related U.S. Application Data

[63] Continuation-in-part of Ser. No. 109,923, Aug. 23, 1993, Pat. No. 5,465,487.

[51] Int. Cl.[6] .......................... B23Q 5/02; B26D 1/60
[52] U.S. Cl. ........................... 29/33 R; 83/76.9; 83/581
[58] Field of Search ........................ 29/33 Q, 33 S, 29/564, 897.35; 83/76.6, 76.9, 581, 468.3, 158; 228/102; 217/83

[56] References Cited

U.S. PATENT DOCUMENTS

| | | | |
|---|---|---|---|
| 1,813,761 | 7/1931 | Pickett | 83/40 |
| 1,837,088 | 12/1931 | Watson | 52/729.1 |
| 2,277,615 | 3/1942 | Townsend | 29/897.35 |
| 2,617,179 | 11/1952 | Burke | 29/897.35 |
| 2,990,038 | 6/1961 | Diamond | 52/636 |
| 3,300,839 | 1/1967 | Licht | 29/897.35 |
| 3,431,806 | 3/1969 | Peterson | 83/561 |
| 3,455,197 | 7/1969 | Richardson | 83/468.3 |
| 3,860,781 | 1/1975 | Aschauer et al. | 219/83 |
| 4,077,287 | 3/1978 | Makeev et al. | 83/158 X |
| 4,129,974 | 12/1978 | Ojalvo | 52/729.1 |
| 4,361,062 | 11/1982 | Reiff | 83/76.9 |
| 4,515,050 | 5/1985 | Haenni et al. | 83/76.6 |
| 4,586,646 | 5/1986 | Booher | 29/897.35 X |
| 4,739,683 | 4/1988 | Ogawa | 83/581 X |
| 4,750,663 | 6/1988 | Warczak | 228/102 |
| 5,038,648 | 8/1991 | Hiraoka | 83/581 X |
| 5,308,675 | 5/1994 | Crane et al. | 428/120 |

FOREIGN PATENT DOCUMENTS 654369  3/1979  U.S.S.R. .................. 29/897.35

*Primary Examiner*—William R. Briggs
*Attorney, Agent, or Firm*—Shoemaker and Mattare, Ltd.

[57] ABSTRACT

Generally trapezoidal web sections of non-uniform shape for fabricating structural I-section beams having varying bending modulus are cut from rectangular plate stock pieces by a shear whose platen is oscillated, as a series of pieces are cut from a length of metal sheet or plate, about an axis perpendicular to the plane of the stock material. The platen angle is determined and controlled by a computer to which design criteria are fed.

2 Claims, 6 Drawing Sheets

５,７８７,５５９

RIGID FRAME CONSTRUCTION APPARATUS

This application is a continuation-in-part of application Ser. No. 08/109,923, filed Aug. 23, 1993, U.S. Pat. No. 5,465,487.

BACKGROUND OF THE INVENTION

This invention relates generally to the fields of metal working and building construction, and more particularly to an automated system for constructing I-section frames of varying cross-section and modulus.

The substructure of a metal building typically includes an array of main load bearing members, commonly called rigid frames. As the bending moment experienced by each such frame varies greatly over its length, tapered I-section beams are commonly used for rigid frames. Tapered beams avoid the material waste and added weight that would result from using is beams of uniform modulus.

In the design of tapered beams, the required modulus is calculated from the design bending moment at each spot along the beam, and the cross-section of the beam at that point is calculated to provide the required modulus.

A common way of varying the modulus of an I-beam is to vary the width of a uniformly thick web extending between the two flanges of the beam; the flanges may be of uniform width and thickness. U.S. Pat. No. 2,990,038 may be representative of such techniques, as it discloses a beam formed from non-orthogonal segments, the web thereof being formed of separate plates.

A tapered beam may be built up of a number of tapered webs, and associated flanges. The individual web sections are welded together to the proper column or rafter length, and then the flanges are welded on to create the I-section. Each tapered, generally trapezoidal web section is typically sheared or plasma cut from standard plate material, normally available in rectangular shapes four to five feet wide, and twelve to twenty feet long. Even with properly thought-out layouts, a great deal of useless scrap can result. The amount of scrap generated can amount to over five percent of the weight of completed rigid frame.

In sheet metal work, scrap reduction is a constant consideration, and much attention has been devoted to this problem over the years. Many patents addressing this problem have been awarded. For example, U.S. Pat. No. 1,813, 761 describes a scrap-free method of cutting metal fence posts from material, and U.S. Pat. No. 2,990,038 suggests a method of forming structural beams with minimal waste.

SUMMARY OF THE INVENTION

An object of this invention is to reduce or eliminate the production of scrap in the manufacture of tapered I-section frames. The sections from which the frame is constructed are sheared from steel plates, along lines that are generally transverse to the length of the stock. By shearing in alternating sequence pieces which are mirror images, scrap is minimized, particularly when the frame being fabricated is symmetrical about a center plane.

According to the invention, the webs of varying modulus I-section beams are built up from a series of generally trapezoidal sections of uniformly thick metal. Design strength requirements are analyzed to determine the optimum shape for each of the web sections.

Once the design is set, the steel plates are moved along a conveyor to a shear having a rotatable platen. The orientation of the shear is controlled, in accordance with the optimum shapes previously determined, while it cuts a series of web sections from the stock material. The web sections thus produced are welded together to form a built-up web, and then flanges are welded to either side of the built-up web, to form an irregular I-section beam.

DESCRIPTION OF THE PREFERRED EMBODIMENT

Figure 1:
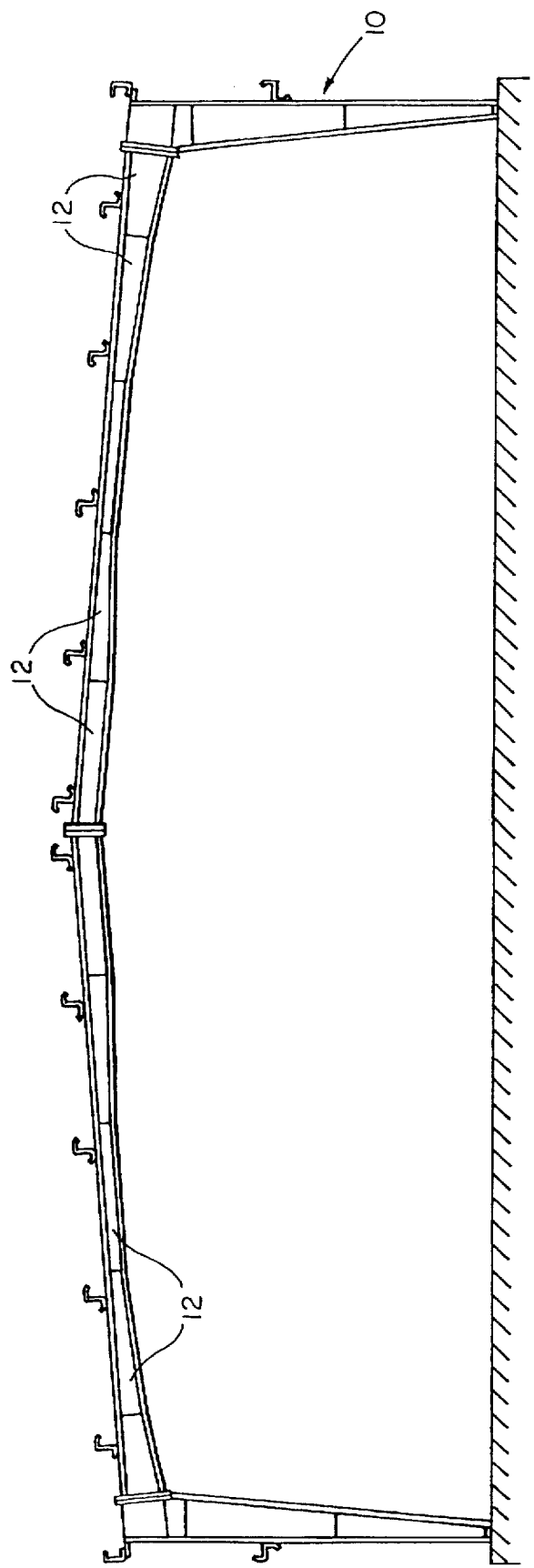
FIG. 1 is a diagrammatic front elevation of a typical rigid frame member for a metal building.
Figure 2:
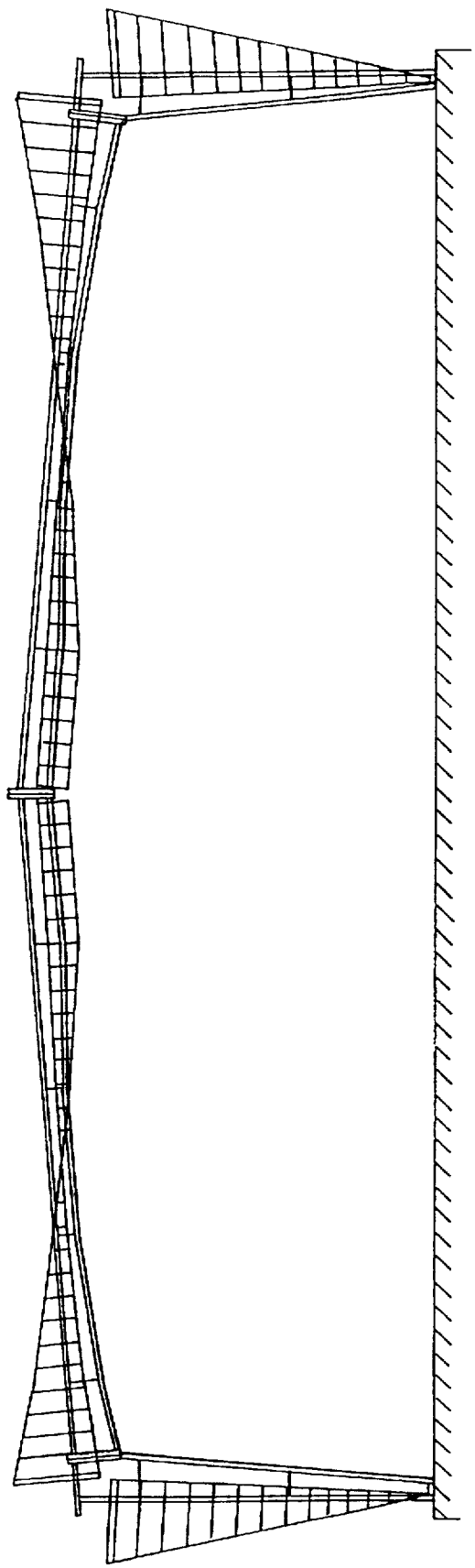
FIG. 2 is a diagram showing calculated bending moments superimposed on the frame of FIG. 1.
Figure 4:
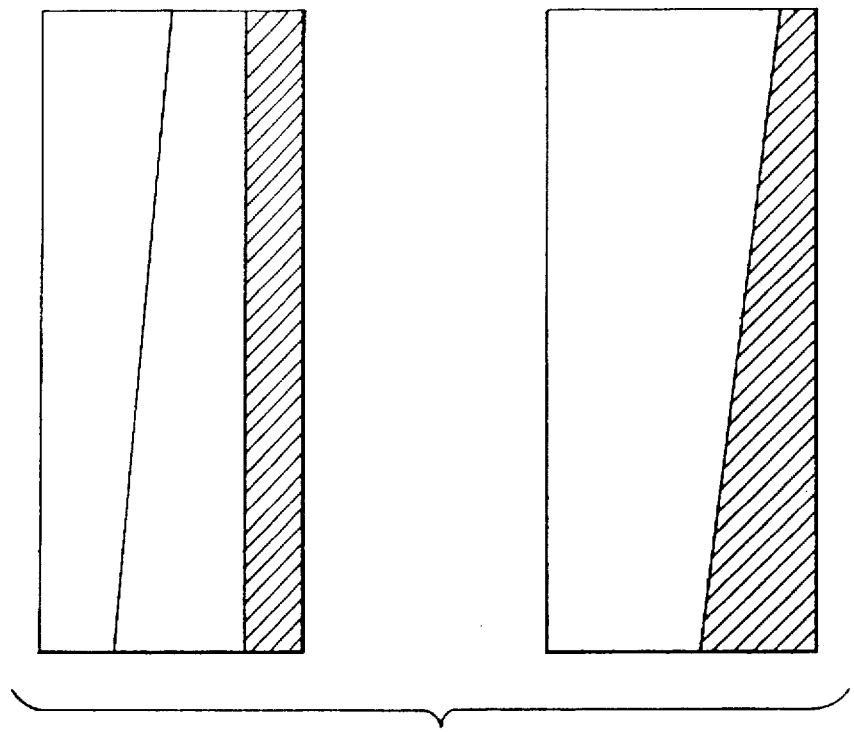
FIG. 4 illustrates a conventional layout for cutting tapered web sections from rectangular plate material.
Figure 3:
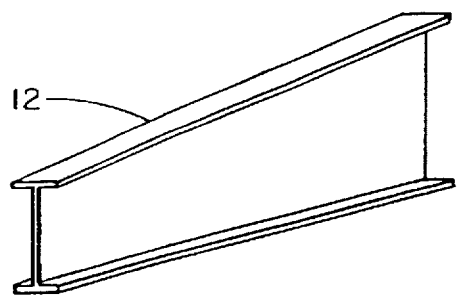
FIG. 3 is a perspective view of a tapered I-section of the beam shown in FIG. 1.
Figure 5:
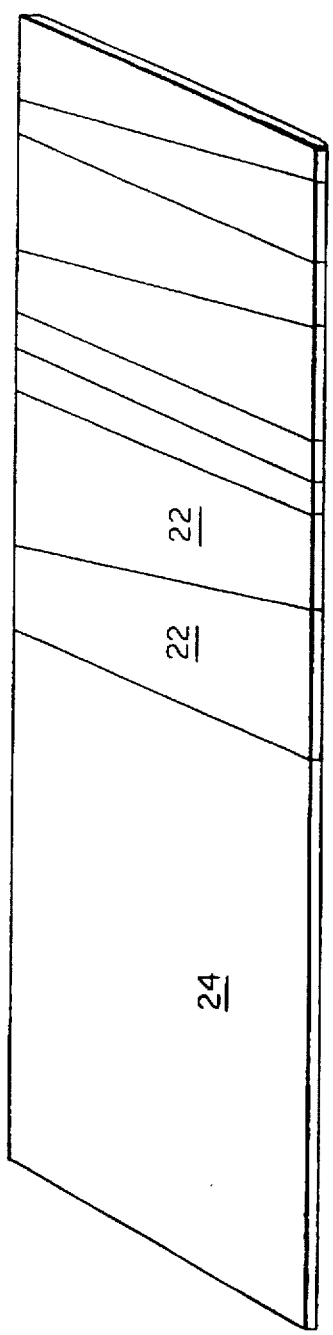
FIG. 5 is a layout for cutting tapered web sections from metal stock, in accordance with the invention.

The rigid frame 10 shown in FIG. 1 is built up from a series of tapered I-beam sections 12, as typified by FIG. 3. The correct variation in shape and size of the sections 12, from one end of the frame to the other, is determined from an analysis of bending moments based on certain accepted assumptions, such as maximum wind loading and uniform roof surface loading. The variation in bending moment (apparent in FIG. 2) determines the required strength or modulus of the frame at each point along its length.

According to the present invention, the frame is built up from a series of generally trapezoidal web sections 22 cut from metal stock. The web sections are designed to be about as long as the stock is wide, to avoid scrap production.

Figure 6:
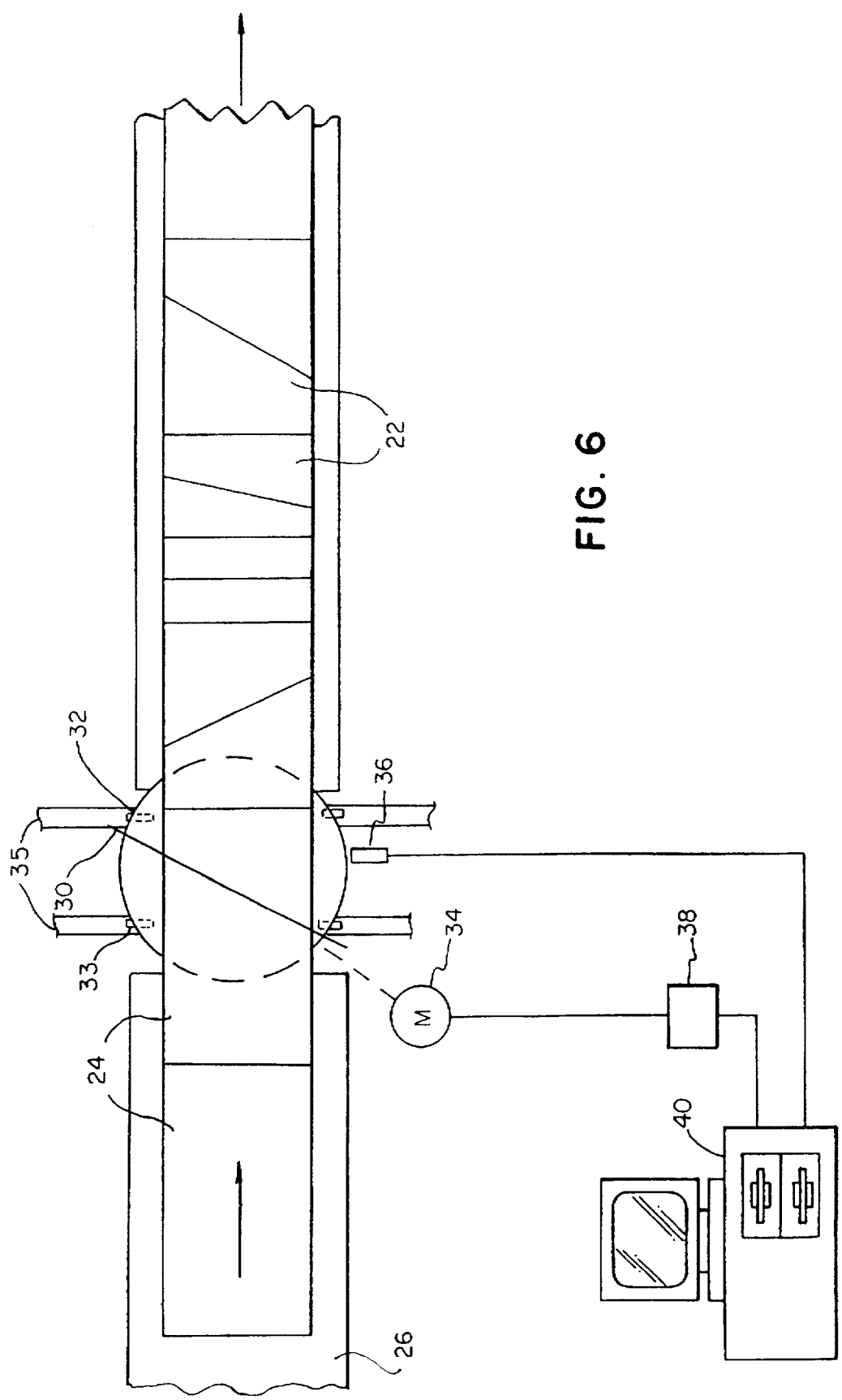
FIG. 6 is a diagrammatic plan view of an apparatus for automatically cutting metal sections from which the rigid frame member is constructed.
Figure 7:
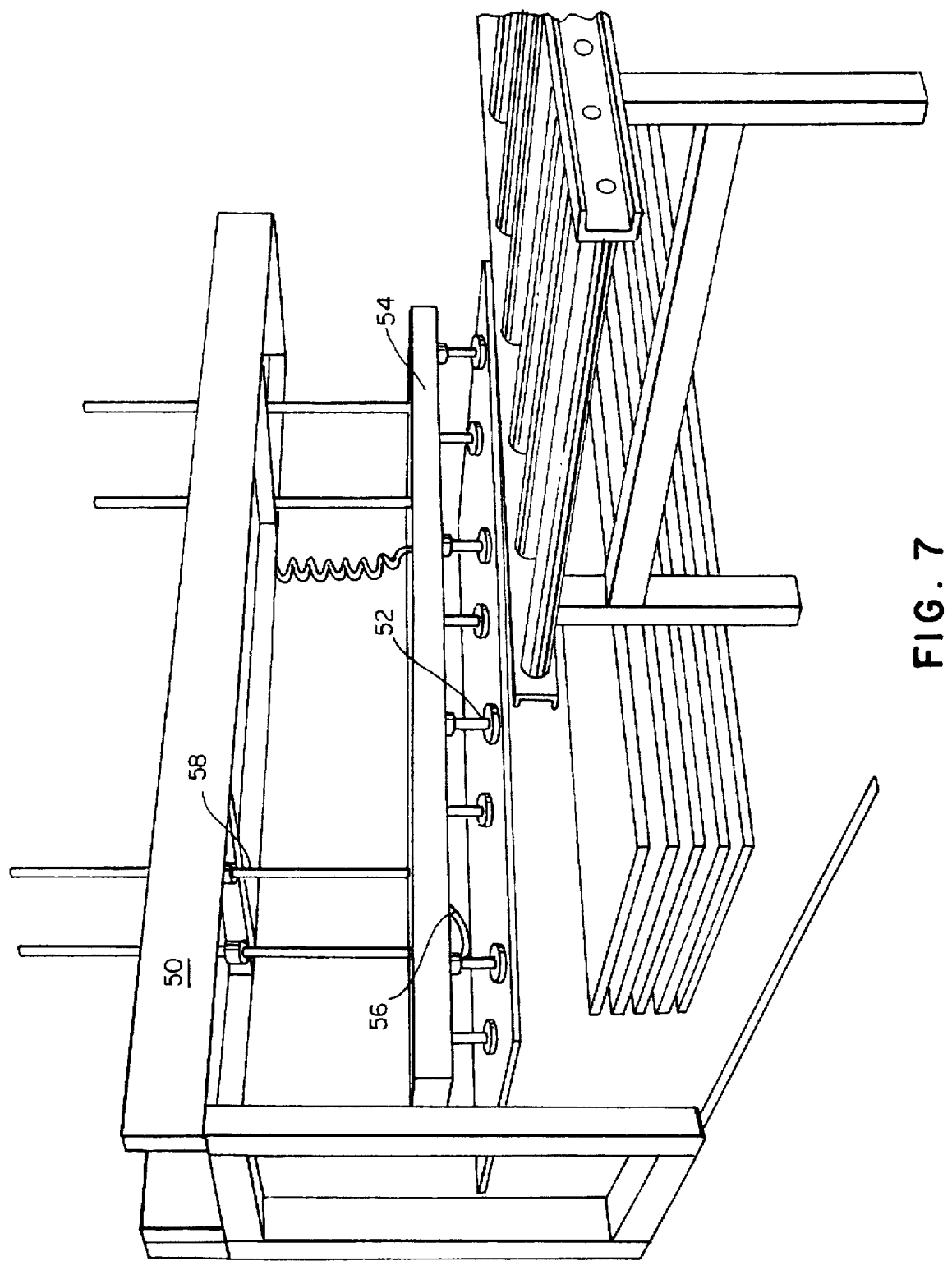
FIG. 7 is a perspective view of a gantry crane used to transfer metal plates from a stack to the conveying path.

The fabrication plant show diagrammatically in FIG. 6 includes means for transferring metal plates 24 from a stack of plates onto a linear conveyor 26, and a shear 30 disposed along the path for making cuts generally transverse to the length of the path.

The conveyor may be a simple roller-type conveyor; the rollers may be powered so that plate movement can be automatically controlled.

The shear has a platen 32 capable of oscillation about an axis perpendicular to the plane of the stock, so that the shear can make cuts perpendicular to the edges of the stock, or oblique thereto. A suitable shear is an HTC #375-8A, modified by adding two additional hydraulic valves for rotational control and a General Electric Series 1 five-unit programmable controller programmed for shear operation, as well as a rotational control valve. The table of the shear has a fabricated steel frame with ball conveyor tables on the infeed and outfeed of the shear to facilitate product movement. The shear is supported by wheels 33, running in tracks 35, perpendicular to the direction of product flow, so that the shear can be moved laterally during operation.

At the upstream end of the conveying path, there is a crane 50, movable transversely of said path, having means for lifting a topmost plate "P" from a stack of plates. This means preferably includes an array of suction cups 52, each supported from the frame 54 of the crane, and a source of vacuum (not shown) connected to the suction cups via hoses 56. Vacuum, supplied to the cups during each lifting cycle, is released when a sheet of metal has been transferred from the stack onto the conveyor. The height of the suction cups can be changed by operating a plurality of powered screw jacks 58. Suitable suction cups and screw jacks are well known; their selection is a matter of ordinary skill. The actual choice will depend on details of the material to be handled.

The orientation of the shear platen is changed automatically by a hydraulic motor 34 (Charlynn #104-1040) and position is monitored by a rotary encoder 36. Position control is performed by a servo type modular controller 38 (Machine Tool Systems #EDC 200) responsive to output from an industrial personal computer 40 into which a database is loaded. The database contains a record for each unique part to be made; each record contains fields containing information on part thickness, width, length, angle of cut, part number and other parameters. On command, the computer initiates automatic continuous production of a series of web pieces, subject to hold or stop instructions from the operator.

In this series of pieces, each adjacent pair of pieces are mirror images; the pieces of each pair lie on opposite sides of an oblique (or perpendicular, if the pieces are rectangular) cut line, and each pair is separated from an adjacent pair by a perpendicular cut line. That is, each pair comprises two pieces which together make up a rectangle, whose width is preferably equal to that of the stock material. In this way, the production of scrap is avoided or minimized.

After the web sections for a particular frame have been cut, they are aligned properly, and then welded together end-to-end to form a built-up web having varying width, as for example, the web shown in FIG. 1. Subsequently, flanges of uniform cross-section are welded to either side of the web to complete the structure. The latter step is not illustrated in the drawings.

An advantage of this invention is that it can be used to custom-make rigid frames for any design situation. With suitable additional programming, the computer can be used to generate stress and strain analysis of the frame under hypothetical input conditions such as wind and snow loading, and frame size can be adjusted accordingly to hold maximum stresses within design limits.

We expect the principles of this invention will find use in various fields, and that details may thus be subject to variations in accordance with its use. For example, the suction cups described above for handling metal plates at the infeed end of the apparatus may be replaced by functionally equivalent devices, such as electromagnets.

Inasmuch as the invention is subject to such modifications and variations, it is intended that the foregoing description and the accompanying drawings shall be interpreted as illustrative of only one form of the invention, whose scope is to be measured by the following claims.

I claim:

1. An apparatus for cutting metal plates generally transverse to their length, said apparatus comprising a shear having a rotatable platen, a conveyor for carrying a series of said plates in a linear path through said shear, and means for transferring plates, one at a time, from a stack of plates adjacent the conveyor onto the conveyor to form said series of plates, said transferring means comprises a crane movable transversely of said path, from a position over said stack to a position over said conveyor, said frame having an array of suction cups for lifting a topmost plate from said stack, and a plurality of screw jacks for elevating the frame to remove the topmost plate from the stack whereafter the plate is transferred to the conveyor.

2. The invention of claim 1, wherein the shear is movable laterally with respect to the path.

* * * * *